Dec. 1, 1931.   H. C. MAPES ET AL   1,834,467
ARM SIGNAL SWITCH
Filed Sept. 25, 1929
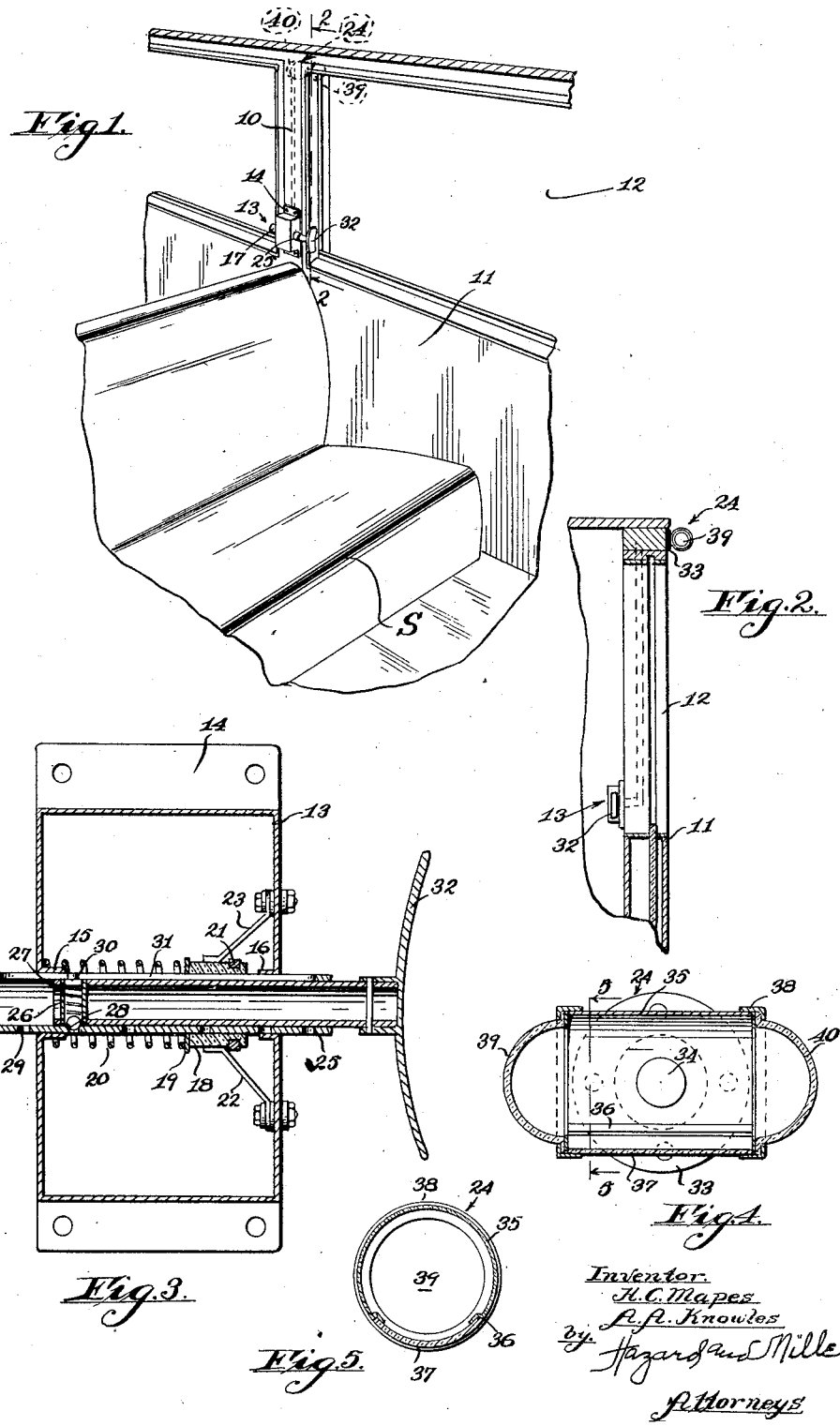

Patented Dec. 1, 1931

1,834,467

UNITED STATES PATENT OFFICE

HERMAN C. MAPES AND AUGUSTUS A. KNOWLES, OF LOS ANGELES, CALIFORNIA

ARM SIGNAL SWITCH

Application filed September 25, 1929. Serial No. 395,145.

This invention relates to an illuminating system for arm signals, such as those that are made by drivers of vehicles, particularly automobiles.

An object of the invention is to provide a system adapted to be actuated by the driver's arm on being extended beyond the door of an automobile, and which on being actuated will throw a light on the extended arm of the driver making the signal. At night it is frequently difficult to see the driver's arm while in extended and signaling position and the purpose of the invention is to properly illuminate the arm so that the signals made thereby will be quite visible to others.

Another object of the invention is to provide a system for illuminating arm signals made by drivers of automobiles, which includes a normally open switch mounted on a stationary part of the body of the vehicle and which is provided with an actuating member extending forwardly over the window opening in the door so that as the driver extends his arm through the window opening to make the arm signal the actuating member will be naturally engaged by the arm without thought or conscious effort on the part of the driver. The improved switch has an adjustable actuating member which can be adjusted as to length so that it may be accommodated to various forms of automobiles wherein the stiles on the doors at the sides of the window opening may vary in thickness.

With the foregoing and other objects in view, which will be made manifest in the following detailed description, and specifically pointed out in the appended claims, reference is had to the accompanying drawings for an illustrative embodiment of the invention, wherein:

Fig. 1 is a partial view in perspective of the interior of an automobile of a closed car type, illustrating the invention as having been applied thereto.

Fig. 2 is a vertical section taken upon the line 2—2 upon Fig. 1.

Fig. 3 is a vertical section through the switch, forming a part of the invention.

Fig. 4 is a longitudinal section through the lamp employed in the system.

Fig. 5 is a transverse section taken upon the line 5—5 upon Fig. 4.

Referring to the accompanying drawings, wherein similar reference characters designate similar parts throughout, the automobile is illustrated as having a vertical jamb 10, adjacent which there is a door 11 opposite the driver's seat S. On the jamb 10, near the bottom of the window opening 12, in the case of a closed car, there is mounted a switch housing 13, having apertured flanges 14 providing for its attachment to the jamb. This switch housing is preferably rectangular in form and in the opposed side walls there are formed apertures about which there are inwardly extending tubular extensions 15 and 16 which form bearings for a tubular member 17, which is longitudinally slidable therethrough. The tubular member 17 carries a ring of insulating material 18 against which there may be a washer 19. A coil spring 20 is compressed between one of the side walls and the washer 19, urging the tubular member into the position shown, although the tubular member may be moved against the action of the spring until the washer 19 engages the end of the tubular extension 15, limiting its movement. A conducting ring 21 surrounds the ring of insulating material 18, adjacent one end, and brushes 22 and 23 bear against the opposite sides of the insulating ring 18 and are adapted to be caused to engage the conducting ring 21. The brushes 22 and 23 are in an electric circuit which is connected to the lamp, generally designated at 24, which is mounted on the exterior of the car near the top of the jamb 10. An actuating member is associated with the tubular member 17, consisting of a tube 25 extending into the tubular member 17. In the rear end of the tube 25 there is a barrel 26 containing a coil spring 27 engaging a ball 28 and urging this ball outwardly into any of a number of apertures 29, which are slightly smaller in size than the diameter of the ball. At the upper end of the barrel there is a stud 30 slidable in a longitudinal slot 31 in the tubular member 17. At the forward end of the tube 25 there is an arm engaging member 32, preferably presenting a concave forward surface.

While various forms of lamp structures may be employed to cast a light on the driver's arm when extended in signaling position, the details of the lamp structure preferably employed are illustrated in Figs. 4 and 5. The lamp structure disclosed therein comprises a base 33 on which there is a lamp socket for the lamp 34. The lamp housing which is mounted on the base may be formed of sheet metal, indicated at 35, bent into approximately three-quarters of a cylinder. The opposed edges of the sheet metal housing 35 are flanged or recessed, as at 36, so as to receive the side edges of a curved lens 37. Retaining rings 38 are positioned on the ends of the housing and serve the double function of holding the curved lens 37 in place between the opposed edges of the sheet metal housing and fastening lens 39 and 40 to the ends of the housing. These lenses or bull's eyes 39 and 40 are preferably colored so that the forward lens will throw a green light and the rear lens throw a red light. When the lamp is mounted on the vehicle and the electric lamp 34 illuminated, light may shine downwardly through the lens 37 and horizontally through both lenses 39 and 40.

The operation and advantages of the improved system are as follows. When the driver of the vehicle extends his arm through the window opening 12 to make a signal, the arm will naturally, without conscious effort on the part of the driver, engage the arm engaging member 32. The ball 28 extending into one of the apertures 29, causes the tubular member 17 to be moved rearwardly by the tube 25, positioning the conducting ring 21 between the brushes 22 and 23, closing the electric circuit through the lamp 34. After the signal has been made and the driver withdraws his arm, the spring 20 returns the structure to its normal position wherein the circuit through the lamp 34 is broken. The purpose of the spring actuated ball 28 is to allow the tube 25 to be adjusted with respect to the tubular member 17. This adjustment can be accomplished by pulling or pushing the tube 25 with excessive force relatively to the tubular member 17, causing the ball 28 to be moved out of the aperture against the action of the spring 27 and snapped into the desired aperture. The stiles at the sides of the window openings 12 vary in thickness on different makes of automobiles and this adjustment enables the construction to accommodate itself to various types of automobiles. The only thing essential is to have the arm engaging member 32 positioned forwardly of the stile so as to be capable of being engaged by the driver's arm.

While the present invention has been designed for use on automobiles of the closed car type, it will be readily appreciated that the same construction can be readily adapted for use on automobiles of the touring or roadster type with but slight alteration.

It will be noted that as all of the contacts and wiring are located on a stationary part of the automobile, rather than on the door, that there will be no chafing of the wiring to weaken the insulation thereon and cause short circuits. At the same time, although the arm engaging member 32 extends across the stile of the door, the improved construction in no way interferes with the normal opening and closing of the door.

Various changes may be made in the details of construction without departing from the spirit or scope of the invention as defined by the appended claims.

We claim:

1. A switch comprising a housing, a tubular member slidable within the housing, a band of insulating material disposed about the tubular member, a conducting band surrounding a portion of the insulating material, contacts adapted to engage the conducting band, spring means urging the tubular member into a position wherein the contacts engage only the insulating material, and an extensible member disposed within the tubular member carrying a spring pressed plunger adapted to engage either of a plurality of apertures in the tubular member to releasably hold the extensible member in adjusted position with respect to the tubular member.

2. A switch comprising a housing, a tubular member slidable in the housing, spring means urging the tubular member into a predetermined position, means for causing an electrical connection to be established when the tubular member is moved against the action of the spring means, and an extensible member carrying a spring pressed plunger adapted to engage any of a series of apertures in the tubular member whereby the extensible member may be adjusted and held in adjusted position with respect to the tubular member.

In testimony whereof we have signed our names to this specification.

HERMAN C. MAPES.
AUGUSTUS A. KNOWLES.